Patented Jan. 29, 1935

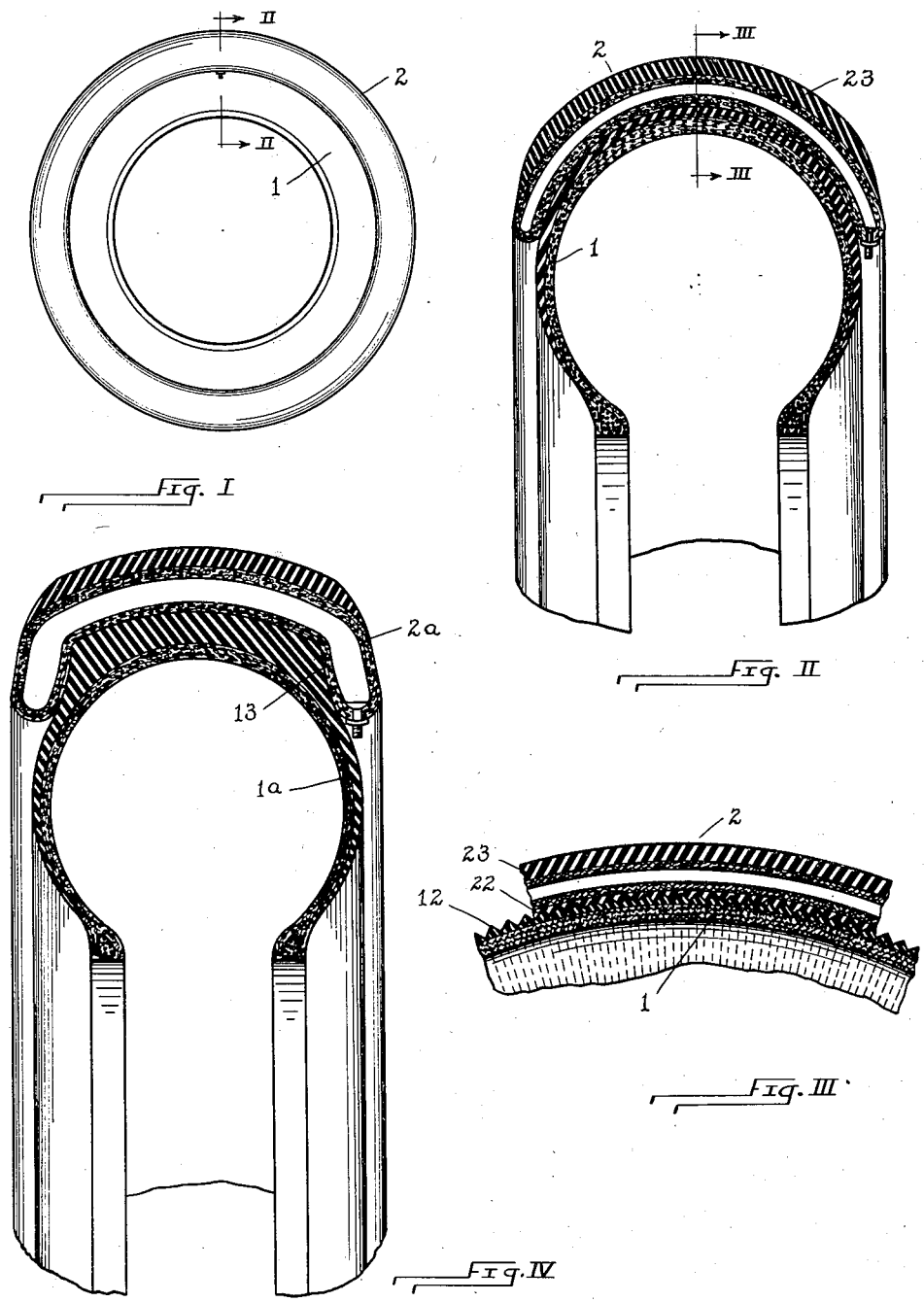

1,989,402

UNITED STATES PATENT OFFICE 1,989,402

AUTOMOBILE TIRE

Harry N. Cupp, Mars, Pa.

Application March 21, 1934, Serial No. 716,617

1 Claim. (Cl. 152—22)

This invention relates to the structure of tires, and particularly of pneumatic tires such as are used upon automotive vehicles; it consists in a separable and deciduous tire part that may be replaced and renewed,—a replaceable and renewable tread member that may be peculiarly adapted to skid-prevention, and that, protecting the tire, may, by virtue of its replaceability, afford to the tire greatly increased length of service.

The invention is illustrated in the accompanying drawing, in which Fig. I is a view in side elevation of a tire shoe or casing that, including a deciduous tread part or member, embodies my invention. Fig. II is a view to larger scale, showing the structure in cross-section, on the plane indicated by the line II—II, Fig. I. Fig. III is a fragmentary view in longitudinal section, on the plane indicated at III—III, Fig. II. Fig. IV is a view corresponding to Fig. II and illustrating a modification in detail.

The life of the present-day automobile tire is limited by the durability of the tread. In practically all cases the tire serves until the mass of rubber that constitutes the tread is worn away and the underlying breaker strip is exposed. When wear has progressed to such degree, danger of blow-out has become imminent. The tire is then removed; and it goes to the scrap-heap. Manifestly the carcass of the tire is still sound; but, since the completed tire, carcass and tread, had initially been vulcanized as a unit, it is impossible by repair to restore what is gone and make a good job of it. Retreaded tires are inferior, and, generally speaking, are not worth the cost of retreading.

The idea of a removable and replaceable tread is not new, but replaceable treads have not hitherto been found practicable, chiefly because of the looseness of union of tread to tire body, in consequence of which looseness of union heat is developed between tread and body when the tire is in service.

This invention consists in broadest terms of a pneumatic tread member, inflated in place, and by inflation secured to the tire carcass in a union that is in effect integral; a member that, being deflated, may readily be removed and replaced.

In Figs. I, II, and III of the accompanying drawing, the body of a tire shoe or casing is indicated at 1, the tread member at 2. Consideration of Fig. II will make plain the fact that the standardized structure of the casing is so far modified that the usual heavy mass of rubber that constitutes the tread is omitted. Instead, the outer face of the casing is overlain with the separable tread member 2. This tread member is essentially a tube of fabric-reenforced rubber, of crescent shape in cross-section, capable of inflation, and so proportioned, relatively to the casing 1, that, when deflated it may be applied to and removed from position upon the casing, and that when (being in position) it is inflated, the pressure of inflation is effective to secure it in intimate union upon the face of the casing.

The crescent shape is such that, not only does the tread member overlie the face of the casing, but it extends over the rotundity of the casing toward the middle region of maximum enlargement, and thus, while replacement under deflation is easy, security under inflation is greatest. The surface of casing may be diversified in shape, to afford increased security of the tread member inflated to place upon it. In exemplification, the casing 1 is shown to be provided with transversely-extending corrugations 12. Additionally, the tread member may be minutely shaped to the same end, as by complementary corrugations 22. Manifestly, the tread member may be cemented to place upon the casing; and, if such be the case, the pneumatic effect described will be effective to counteract disruptive strains and eliminate their effect.

The outer wall of the tread member will be thickened by a road-engaging facing 23 of rubber. This rubber facing 23 may be superficially shaped, by expedients known to the art, to increase the security of engagement with the road surface and to decrease the liability to skid.

The advantages of this structure lie in and are realized in the following features and characteristics: first, the pneumatic characteristic of the tire body is enhanced by the pneumatic characteristic of the tread member; second, a certain flexibility is introduced between the tire body and the road surface that results in a firmer hold of the tread member upon the road surface, and better security against skidding. This enhanced road-gripping effect may be varied by varying the pressure of inflation of the tread member. Third, by virtue of removability and replaceability of the tread member, the life of the body of the casing may be greatly prolonged.

Fig. IV serves to show that it is not requisite to the enjoyment of the invention, that a specially built casing be employed. The tread member 2a, properly shaped in detail, may be made applicable to and removable from a casing 1a that is of standard configuration in all respects, including the usual tread mass. In this case, because of the shape of the casing with its massive tread, shoulders 13 are afforded, against which the overlying tread member may by inflation be made to bear, effecting security. Manifestly the tread member of the invention is applicable to these and other varieties in the shaping of the casing.

I claim as my invention:

A tire for vehicles including a hollow, flexible-walled, pneumatic casing with rounded outer face, and a pneumatic tread member applicable to and removable from the outer face of the casing, said tread member being essentially crescent-shaped in cross-section and when applied overlying the face of the casing and extending over the rotundity thereof and affording a cushioning body of air of greatest depth on the mid-line of the casing and of diminishing depth laterally from such mid-line upon the rotundity thereof, such tread member being susceptible by inflation to being secured in its position upon the casing.

HARRY N. CUPP.